Figure 1:
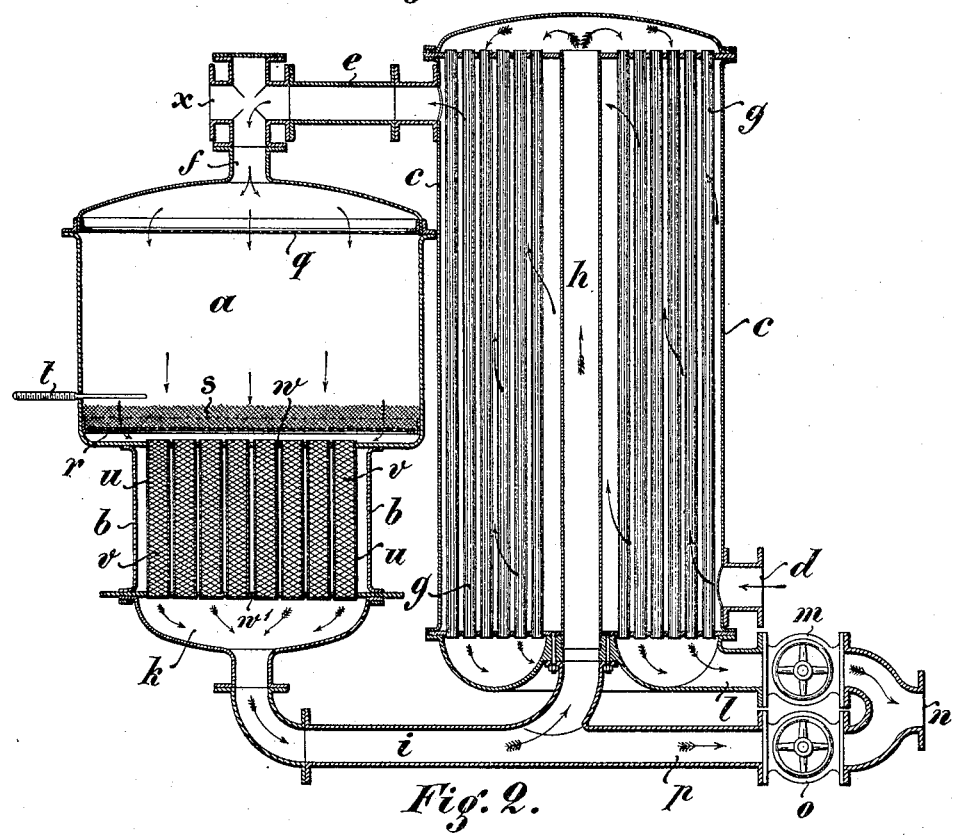

No. 792,205. PATENTED JUNE 13, 1905.
G. ESCHELLMANN & A. HARMUTH.
CATALYTIC APPARATUS FOR MAKING SULFURIC ANHYDRID.
APPLICATION FILED FEB. 6, 1905.

WITNESSES:
A. L. O'Brien
E. Van Zandt

INVENTORS
G. Eschellmann & A. Harmuth,
by
Dickerson, Brown, Raegener & Binney
Attys No. 792,205.

Patented June 13, 1905.

UNITED STATES PATENT OFFICE.

GEORG ESCHELLMANN AND ALBERT HARMUTH, OF ST. PETERSBURG, RUSSIA, ASSIGNORS TO TOV. TENTELEVSKAGO XIMICHESK ZAVODA, OF ST. PETERSBURG, RUSSIA.

CATALYTIC APPARATUS FOR MAKING SULFURIC ANHYDRID.

SPECIFICATION forming part of Letters Patent No. 792,205, dated June 13, 1905.

Application filed February 6, 1905. Serial No. 244,349.

*To all whom it may concern:*

Be it known that we, GEORG ESCHELLMANN, doctor of philosophy, a subject of the King of Great Britain, and ALBERT HARMUTH, a subject of the King of Prussia, German Emperor, both residing at St. Petersburg, Russian Empire, have invented a new and useful Catalytic Apparatus for the Manufacture of Sulfuric Anhydrid, of which the following is a specification.

This invention relates to improvements upon apparatus for the manufacture of sulfuric anhydrid from sulfurous-acid gas and oxygen or atmospheric air by the agency of suitable catalytic substances, and especially upon apparatus of this kind in which a large chamber is arranged in front of the catalytic substance contained in a system of tubes (called "catalytic tubes") and is supplied through an opening in its top with the gaseous mixture to be treated from a preheater in which the said mixture is heated according to the indications of a thermometer placed in said large chamber in the zone next to the upper extremities of the catalytic tubes. The purpose of arranging said large space or chamber in front of the catalytic substance is to enable the latter to automatically prevent accumulation of surplus heat within it by at once transferring the same by radiation to a large body of gases. Now we have found that the efficiency of said apparatus will be considerably increased by subdividing the catalytic substance into two portions, arranging one portion as a uniform even layer in front of the tubes, which are filled with the remaining portion of the catalytic substance, and protecting the catalytic tubes against losses of heat, while the upper layer is allowed to freely radiate heat into the large gas-chamber in front of it. With this subdivision and modified arrangement of the catalytic substance in an upper portion which is cooled by radiation and a lower portion which is protected against cooling the same quantity of catalytic substance as used in the older apparatus has proved to be able to transform from ninety-five to ninety-seven per cent. of the sulfurous-acid gas presented to it into sulfuric anhydrid with the assistance of but one-half of that amount of power which it is necessary to apply when all of the catalytic substance is placed in the tubes as in the older apparatus. This rise of efficiency obtained by the described modified arrangement of the catalytic substance is believed to be principally due to the increased heat-radiating capacity of said substance resulting from the increased surface given to the upper portion thereof by spreading out the same over a by far larger surface than that which the catalytic substance will present to the body of gases in front of it when exclusively contained in tubes.

By the present improved arrangement of the catalytic substance the latter is allowed to at once act upon a large proportion of the sulfurous-acid gas present, and the sulfuric anhydrid formed is protected against being redecomposed by the action of the heat resulting from such increased reaction, because the acting substance by its large surface causes a large portion of the heat developed to be at once expelled from it by radiation, whereby overheating of the catalytic substance is prevented. The thickness to be given to the said upper layer of catalytic substance with a given diameter of the gas-chamber must be determined by experiment. It should be such that in the zone of the gas-chamber adjacent to the surface of the upper catalytic layer a temperature of about 450° centigrade can be maintained by properly adjusting the temperature of the gaseous mixture to be treated, which is supplied to the gas-chamber at the top of same, this temperature of 450° centigrade in said zone having proved to be most advantageous. If the temperature of said zone shows to rise above 450° centigrade, the preheating of the gaseous mixture is reduced, whereas it is increased when the thermometer in said zone shows the temperature of the latter to fall below 450° centigrade.

The preheating of the gaseous mixture to be treated is operated in known manner by the heat of the sulfuric anhydrid formed.

In constructing our improved apparatus we prefer to make the upper portion or upper chamber of the same, forming the gas-chamber and containing the upper portion or layer of the catalytic substance, wider than its lower portion or lower chamber, containing the tubes filled with the lower portion of the catalytic substance, so that the upper chamber extends all around beyond the lower chamber. Moreover, the lower chamber is isolated from the upper chamber by a tubular plate which receives the upper extremities of the catalytic tubes contained in said lower chamber, the purpose of this isolation being to prevent gas circulation from the upper chamber into the lower chamber along the outer walls of the catalytic tubes, and vice versa, which circulation might have a cooling action upon said tubes.

It is evident that the lower portion of the catalytic substance instead of being subdivided between a number of tubes may be filled in one tube made with a correspondingly larger diameter, such enlarged tube constituting the lower narrower portion or lower chamber of the apparatus. As with this modified construction the lower portion of the catalytic substance is not surrounded by protecting air or gas spaces as it is when filled in a number of tubes arranged in an inclosing chamber, the lower tubular chamber of the apparatus should be carefully protected by an isolating-jacket in well-known manner.

On the annexed sheet of drawings we have illustrated in a somewhat schematical manner two forms of constructing our improved apparatus, the supporting and inclosing masonry, as also the isolating-jacket of the lower portion of the apparatus, being omitted.

Figure 2:
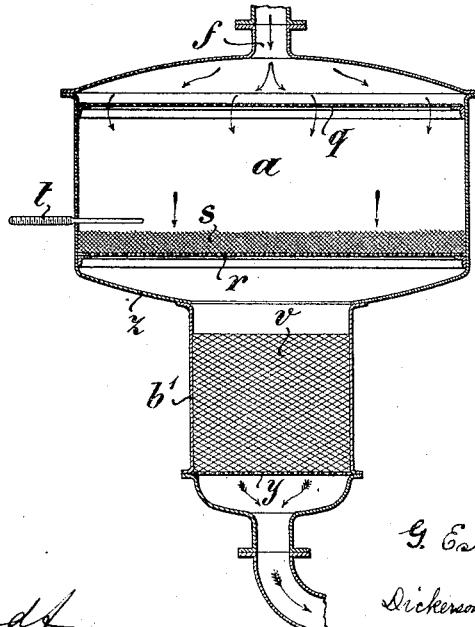

Figure 1 is a vertical central section through one form of apparatus; and Fig. 2, a similar section through another form, the preheater and its connections with the catalytic chambers not being shown.

In both figures corresponding parts are marked with identical letters of reference.

Referring to Fig. 1, $a$ is the upper chamber or gas-chamber, $b$ the lower chamber, and $c$ a tubular preheater of known type having at its bottom the inlet-opening $d$ for the mixture of sulfurous-acid gas and air to be treated and being at its top connected, through a pipe $e$, with the supply-opening $f$ in the top of the gas-chamber $a$. The upper ends of the pipes or tubes $g$ of the preheater are in communication through the wider central pipe $h$ and the pipe $i$ with the collecting-chamber $k$, which receives the hot mixture of sulfuric anhydrid, nitrogen, and remaining air and sulfurous-acid gas as it leaves chamber $b$. At their lower ends said pipes $g$ are in communication, through pipe $l$ and valve $m$, with the exit-opening $n$, which opening is, moreover, connected, through a valve $o$, with a pipe $p$, branched off from the pipe $i$. In the gas-chamber $a$ is arranged at a small distance below the inlet-opening $d$ a perforated plate $q$, the office of which is to evenly distribute the incoming gases over the entire sectional area of the chamber $a$. In the lower part of the latter and in proximity to the chamber $b$ is arranged a perforated plate $r$, preferably of cast-iron, and this plate is covered with catalytic substance, which is evenly spread out, so as to fill the entire sectional area of the chamber $a$ with a catalytic layer $s$ of uniform thickness. In that zone of the chamber $a$ which is adjacent to the catalytic layer $s$ is inserted a thermometer $t$. In the lower chamber $b$ are inclosed a number of vertically-arranged tubes $u$, filled with catalytic substance $v$. The upper ends of the tubes $u$ open through corresponding holes of an upper tubular plate $w$ into the gas-chamber $a$ below the catalytic layer $s$, and the lower extremities open through corresponding holes of a lower tubular plate $w'$ into the collecting-chamber $k$. The outside of the lower chamber $b$ is provided in well-known manner with an isolating-jacket, which is omitted from the drawings.

$x$ is an opening for supplying the apparatus with hot air to heat it up to the temperature required previous to the admission of the gaseous mixture to be treated. As soon as the thermic condition required for starting the process is established the hot-air supply is stopped by means of a valve. (Not shown.)

Supposing the apparatus to be in full working, the thermometer $t$ indicating a temperature of 450° centigrade, the preheated mixture of sulfurous-acid gas and atmospheric air leaves the preheater $c$ through pipe $l$ and enters the upper chamber $a$ through the opening $f$ in the top thereof and is at once distributed by the perforated plate $q$ over the entire sectional area of said chamber. In passing down toward the catalytic layer $s$ the gaseous mixture becomes hotter and hotter, and finally acquires the temperature of 450° centigrade. With this temperature it then penetrates into and through the catalytic layer $s$, with the effect that the larger portion of its sulfurous-acid gas is readily transformed into sulfuric anhydrid. At once a large portion of the heat developed by this reaction separates from the catalytic layer $s$ by radiation into the large chamber $a$, where it is taken up by the gases, and so efficient is this radiation that any injurious accumulation of heat within the said layer and overheating of the latter are prevented, provided the temperature of the incoming gaseous mixture be properly adjusted. The hot mixture of sulfuric anhydrid formed, nitrogen, and unaltered sulfurous-acid gas and air now passes into and through the catalytic tubes $u$, where the reaction is repeated. This complementary or finishing reaction taking place with a comparatively small proportion of sulfurous-acid gas, no overheating of the catalytic substance $v$ contained in the tubes $u$ can take place; but the heat developed in coöperation with the heat of the penetrating-gases is just sufficient to maintain said tube in the active condition provided the chamber $b$ be sufficiently protected against losses of heat. The gases escaping from the lower extremities of the catalytic tubes $u$ collect in the chamber $k$ and from thence pass through the pipe $i$, where a smaller or greater portion, dependent upon the adjustment of the valves $m$ and $o$, is branched off and caused to pass through the pipes $h$ and $g$ of the preheater $c$, the pipe $l$, and valve $m$ to the exit-opening $n$, the remainder of the gases passing directly from pipe $i$ through pipe $p$ and valve $o$ to the exit-opening $n$. If at any time a temperature higher than 450° centigrade is indicated by the thermometer $t$, the valves $m$ and $n$ are so adjusted that the preheater is supplied with a smaller amount of hot gases from pipe $i$ until the thermometer $t$ shows again the normal temperature of 450° centigrade, whereas said valves are adjusted to branch off a larger amount of the hot gases into and through the preheater when the thermometer $t$ indicates a temperature below 450° centigrade.

Practical working has proved that the valves $m$ and $o$ being once properly adjusted the apparatus will work for a long period of time without requiring readjustment of said valves and that in case of need the reëstablishment of the normal temperature is easily and quickly obtained by the manipulation of said valves.

In the modified construction shown in Fig. 2 a wide tube $b'$ is substituted for the chamber $b$ and its inclosed catalytic tubes $u$. This tube $b'$ is provided near its lower end with a perforated plate $y$ or other suitable support permeable to gases, and the catalytic substance $v$, which with the construction shown in Fig. 1 is contained in the tubes $u$, is placed upon this support $y$. In all other respects the apparatus is similar to that described with reference to Fig. 1. In this instance it is the bottom wall $z$ of the chamber $a$ which prevents the hot gases escaping from the catalytic layer $s$ to circulate around the tube $b'$, which is provided with a heat-isolating jacket. (Not shown.)

What we claim as our invention is—

In apparatus of the kind described the combination, with the upper large gas-receiving chamber having a gas-inlet at its top and a perforated distributing-plate arranged below the same, the lower chamber provided with catalytic substance, the collecting-chamber, the preheater, connections between the preheater and said upper chamber and collecting-chamber, means for adjusting the connection between the collecting-chamber and the preheater on the one hand and the collecting-chamber and the exit-opening for the sulfuric anhydrid produced on the other hand, of a layer of catalytic substance, arranged in front of the lower catalytic chamber, a support for said catalytic layer, a thermometer arranged in the zone of the upper chamber which is nearest to the said catalytic layer, means whereby the gases escaping from the said catalytic layer are prevented from contact with the outer wall or walls inclosing the lower catalytic substance, and means for protecting the latter against losses of heat, substantially as and for the purpose stated.

In testimony whereof we have hereunto set our hands in presence of two subscribing witnesses.

GEORG ESCHELLMANN.
ALBERT HARMUTH.

Witnesses:
H. A. LOVINGHIN,
JOHN MUELLER.